(12) United States Patent  
Ramos et al.

(10) Patent No.: US 9,384,216 B2  
(45) Date of Patent: Jul. 5, 2016

(54) BROWSING RELATED IMAGE SEARCH RESULT SETS

(75) Inventors: Gonzalo A. Ramos, Bellevue, WA (US); Steven M. Drucker, Bellevue, WA (US); Amir Akbarzadeh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 499 days.

(21) Appl. No.: 12/947,603

(22) Filed: Nov. 16, 2010

(65) Prior Publication Data

US 2012/0124036 A1     May 17, 2012

(51) Int. Cl.
*G06F 7/00* (2006.01)
*G06F 17/30* (2006.01)

(52) U.S. Cl.
CPC .... *G06F 17/30274* (2013.01); *G06F 17/30126* (2013.01); *G06F 17/30713* (2013.01); *G06F 17/30867* (2013.01); *G06F 17/30905* (2013.01)

(58) Field of Classification Search
CPC ................. G06F 17/30867; G06F 17/30905; G06F 17/30126; G06F 17/30713
USPC ......................................................... 707/706
See application file for complete search history.

(56) References Cited

U.S. PATENT DOCUMENTS

| | | | |
|---|---|---|---|
| 5,220,625 A * | 6/1993 | Hatakeyama et al. | 715/809 |
| 5,835,094 A * | 11/1998 | Ermel et al. | 715/848 |
| 6,233,586 B1 | 5/2001 | Chang et al. | |
| 6,426,761 B1 | 7/2002 | Kanevsky et al. | |
| 6,574,632 B2 * | 6/2003 | Fox et al. | |
| 7,437,005 B2 * | 10/2008 | Drucker et al. | 382/224 |
| 8,131,702 B1 * | 3/2012 | Bharat et al. | 707/706 |
| 8,352,465 B1 * | 1/2013 | Jing et al. | 707/723 |
| 2002/0055946 A1 * | 5/2002 | Prager et al. | 707/500 |
| 2002/0105541 A1 | 8/2002 | Endou et al. | |
| 2006/0038796 A1 * | 2/2006 | Hinckley et al. | 345/173 |
| 2006/0048076 A1 * | 3/2006 | Vronay et al. | 715/850 |
| 2007/0028267 A1 | 2/2007 | Ostojic | |
| 2007/0174269 A1 | 7/2007 | Jing et al. | |
| 2007/0174790 A1 * | 7/2007 | Jing et al. | 715/838 |
| 2007/0226255 A1 | 9/2007 | Anderson | |

(Continued)

FOREIGN PATENT DOCUMENTS

| | | |
|---|---|---|
| EA | 008675 B1 | 6/2007 |
| EP | 1087303 A2 | 3/2001 |

(Continued)

OTHER PUBLICATIONS

First Chinese Office Action cited in Chinese Application No. 201110362986.3 dated Dec. 6, 2012, 2 pgs.

(Continued)

*Primary Examiner* — Charles Lu
(74) *Attorney, Agent, or Firm* — Tom Wong; Steven Spellman; Micky Minhas

(57) ABSTRACT

Methods are provided for displaying image results responsive to a search query. In addition to displaying responsive results for a query, responsive results are also provided for related queries. The results are ordered along a plurality of display axes, including at least one axis corresponding to the ordering of the various search queries. The results can be displayed in an aligned or non-aligned manner. The results can then be translated along one or more of the display axes to allow a user to browse the various results.

20 Claims, 12 Drawing Sheets

(56) References Cited

U.S. PATENT DOCUMENTS

| | | |
|---|---|---|
| 2007/0239698 A1 | 10/2007 | Quinn-Jacobs |
| 2007/0299830 A1 | 12/2007 | Muenchhoff |
| 2008/0033935 A1 | 2/2008 | Frank |
| 2008/0066000 A1 | 3/2008 | Ofek |
| 2008/0094370 A1* | 4/2008 | Ording et al. .......... 345/173 |
| 2008/0109750 A1* | 5/2008 | Lin-Hendel .......... 715/785 |
| 2008/0141126 A1* | 6/2008 | Johnson et al. .......... 715/273 |
| 2009/0070669 A1 | 3/2009 | Hirota |
| 2009/0187558 A1* | 7/2009 | McDonald .......... 707/5 |
| 2009/0293013 A1 | 11/2009 | O'Shaugnessy et al. |
| 2010/0031152 A1 | 2/2010 | Villaron |
| 2010/0114991 A1 | 5/2010 | Chaudhary et al. |
| 2010/0131443 A1 | 5/2010 | Agarwal et al. |
| 2010/0199205 A1 | 8/2010 | Gemmell et al. |
| 2010/0199219 A1 | 8/2010 | Poniatowski |
| 2010/0211489 A1 | 8/2010 | Zhang et al. |
| 2010/0299342 A1 | 11/2010 | Gustafson et al. |
| 2011/0106808 A1 | 5/2011 | Hersans et al. |
| 2011/0119572 A1 | 5/2011 | Jang et al. |
| 2011/0119714 A1* | 5/2011 | Murthy et al. .......... 725/52 |
| 2011/0154268 A1 | 6/2011 | Trent, Jr. et al. |
| 2012/0124625 A1 | 5/2012 | Foote et al. |
| 2012/0291079 A1 | 11/2012 | Gordon et al. |
| 2012/0304123 A1 | 11/2012 | Koradi |
| 2013/0006972 A1 | 1/2013 | Ramos et al. |
| 2013/0047080 A1 | 2/2013 | Kroeger et al. |
| 2013/0232148 A1 | 9/2013 | MacDonald et al. |

FOREIGN PATENT DOCUMENTS

| | | |
|---|---|---|
| JP | 09-037181 | 2/1997 |
| JP | 2001-005822 | 1/2001 |
| JP | 2005-202535 | 7/2005 |
| JP | 2006-014237 | 1/2006 |
| JP | 2006-301872 | 11/2006 |
| JP | 2007-148948 | 6/2007 |
| JP | 2008-217117 | 9/2008 |
| JP | 2008-257341 | 10/2008 |
| JP | 2010-205308 | 9/2010 |
| JP | 2010-250448 | 11/2010 |
| TW | 200907781 | 2/2009 |

OTHER PUBLICATIONS

Preliminary Amendment cited in U.S. Appl. No. 13/409,740 dated Apr. 26, 2012, 7 pgs.
"Master Thesis in HC/Interaction Design-User Experience of Mobile WebBrowsing: User Experience Analysis and Development of Rendering Strategies", Wolfgang Maehr, 2007 reprinted from the internet at: http://download.njyo.net/pubs/Maehr-2007-user_Experience_of_Mobile_Web_Browsing.pdf, 136 pgs.
"Designing an Interface and Path Translator for a Smart Phone-Based Indoor Navigation System for Visually Impaired Users", Hend K. Gedawy, Dec. 2011, reprinted from the Internet at: http://reportrs-archive.adm.cs.cmu.edu/anon/anon/gatar/CMU-cs-11-125.pdf, 81 pgs.
"Porting a Web-Based Mapping Application to a Smartphone App", Hanan Samet, Marco D. Adelfio, Brendan C. Fruin, Michael D. Lieberman and Benjamin E. Teitler, Proceedings of the 19th ACM SIGSPATIAL International Conferfence on Advances in Geographic Information Systems, Chicago, Nov. 1-4, 2011, 4 pgs.
"myCOMAND: Automotive HMI Framework for Personalization of Web-based Content Collections", Philipp Ifscher and Andreas Nurnberger, Proceedings of the IEEE International Conference on Systems, Man and Cytbernetics, Istanbul, Oct. 10, 2010, pp. 2907-2913.
"Understanding the Effects and Implications of Gesture-Based Interaction for Dynamic Presentations", Adam Fourney, Michael Terry and Richard Mann, Mar. 2010, reprinted from the Internet at: http://www.cs.uwaterloo.ca/research/tr/2010/CS-2010-03.pdf, pp. 1-10.
"Touch Screen Mobile Devices Invading the Internet: UX Guidelines Towards One Web", Liisa-Maija Keinanen, reprinted from the Internet at: http://lib.tkk.fi/Dipl/2011/urn100420.pdf, 95 pgs.
Pulse—Follow Superbowl XLVI with Patriots & Giants News, 2012, Reprinted from the Internet at: http://blog.pulse.me/post/16934334339/follow-superbowl-xlvi-with-patriots-giants-news, 11 pgs.
"Pulse News Launches 2.0 Update for Android and iPhone", Mar. 25, 2011, reprinted from the Internet at: http://www.businesswire.com/news/home/20110325005150/en/Pulse-News-Launches-2.0-Update-Android-iPhone, 2 pgs.
"Stanford Graduates Release Pulse, A Must-Have News App for the iPad", May 31, 2010, reprinted from the Internet at: http://techcrunch.com/2010/05/31/pulse-ipad/, 5 pgs.
"International Search Report", Mailed Date: Apr. 10, 2012, Application No. PCT/US2011/059020, Filed Date: Nov. 2, 2011, pp. 9.
Magic Ink Information Software and the Graphical Interface—Published Date: Mar. 2006 http://worrydream.com/MagicInk/.
Information Visualization—Published Date: 2006 http://www.digitalartguild.com/content/view/43/26/.
Chinese Notification to Grant in Chinese Application No. 201110362986.3 dated Nov. 3, 2014, 2 pgs.
European Communication in Application 11842381.3, mailed Jun. 25, 2013, 2 pgs.
European partial Search Report in Application 11842381.3, mailed Nov. 13, 2014, 6 pgs.
U.S. Appl. No. 13/409,740, Amendment and Response filed Nov. 3, 2014, 17 pgs.
U.S. Appl. No. 13/616,617, Amendment and Response filed Nov. 20, 2014, 14 pgs.
Non-Final Office Action cited in U.S. Appl. No. 13/409,740 dated Jun. 27, 2013, 18 pgs.
Reply Non-Final Office Action cited in U.S. Appl. No. 13/409,740 dated Nov. 26, 2013, 12 pgs.
Non-Compliant Office Action cited in U.S. Appl. No. 13/409,740 dated Dec. 15, 2013, 2 pgs.
Reply Non-Compliant Office Action cited in U.S. Appl. No. 13/409,740 dated Feb. 5, 2014, 13 pgs.
Final Office Action cited in U.S. Appl. No. 13/409,740 dated May 1, 2014, 14 pgs.
Non-Final Office Action cited in U.S. Appl. No. 13/616,617 dated May 20, 2014, 15 pgs.
Int. Preliminary Report cited in PCT Application No. PCT/US2011/059020 dated May 21, 2013, 5 pgs.
Reply first Chinese Office Action cited in Chinese Application No. 201110362986.3 dated Mar. 18, 2013, 4 pgs.
Second Chinese Office Action cited in Chinese Application No. 201110362986.3 dated Aug. 6, 2013, 1 pg.
Third Chinese Office Action cited in Chinese Application No. 201110362986.3 dated Feb. 17, 2014, 3 pgs.
Reply third Chinese Office Action cited in Chinese Application No. 201110362986.3 dated Jul. 8, 2014, 4 pgs.
European Extended Search Report in Application 11842381.3, mailed Mar. 2, 2015, 12 pgs.
U.S. Appl. No. 13/616,617, Office Action mailed Mar. 12, 2015, 13 pgs.
European Communication in Application 11842381.3, mailed Mar. 19, 2015, 1 page.
U.S. Appl. No. 13/409,740, Non-Final Office Action cited mailed Apr. 14, 2015, 18 pgs.
Japanese Office Action in Application 2013-539873, mailed Sep. 17, 2015, 9 pgs.
U.S. Appl. No. 13/616,617, Amendment and Response filed Sep. 30, 2015, 14 pgs.
U.S. Appl. No. 13/616,617, Office Action mailed Oct. 30, 2015, 14 pgs.
Taiwanese Office Action and Search Report in Application 100135319, mailed Nov. 6, 2015, 11 pgs.
U.S. Appl. No. 13/409,740, Office Action mailed Dec. 11, 2015, 22 pgs.
U.S. Appl. No. 13/616,617, Amendment and Response filed Jun. 11, 2015, 22 pgs.
U.S. Appl. No. 13/616,617, Office Action mailed Jul. 2, 2015, 13 pgs.

(56) References Cited

OTHER PUBLICATIONS

U.S. Appl. No. 13/409,740, Amendment and Response filed Aug. 14, 2015, 11 pgs.
U.S. Appl. No. 13/616,617, Amendment and Response filed Jan. 7, 2016, 13 pgs.
U.S. Appl. No. 13/616,617, Notice of Allowance mailed Feb. 26, 2016, 5 pgs.
U.S. Appl. No. 13/409,740, Amendment and Response filed Feb. 5, 2016, 12 pgs.
U.S. Appl. No. 13/616,617, USPTO Response mailed Apr. 12, 2016, 1 page.
U.S. Appl. No. 13/409,740, Office Action mailed May 4, 2016, 22 pgs.
Australian Office Action in Application 2011329379, mailed Mar. 24, 2016, 4 pgs.

\* cited by examiner

FIG. 5

| | | | |
|---|---|---|---|
| Martha Washi 330 | 332 | 333 | 334 |
| George Washington 310 | 312 | 313 | 314 |
| John Adams 320 | 322 | 323 | 324 |
| omas erson 540 | 542 | 543 | 544 |

BROWSING RELATED IMAGE SEARCH RESULT SETS

BACKGROUND

Early search techniques for network documents focused primarily on text-based documents that could be identified by a keyword. More recently, searches for images located on a device or a network are becoming increasingly popular. As network and/or processor speeds increase while the cost of storage decreases, the number of images available for retrieval by a search will continue to grow.

SUMMARY

In various embodiments, methods and/or computer executable instructions embodied on computer readable media are provided for displaying image results responsive to a search query. In addition to displaying responsive results for a query, responsive results are also provided for related queries. The results are ordered along a plurality of display axes, including at least one axis corresponding to the ordering of the various search queries. The results can be displayed in an aligned or non-aligned manner. The results can then be translated along one or more of the display axes to allow a user to browse the various results.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein:

FIG. 5 schematically shows a display of ordered results during translation along a display axis according to an embodiment of the invention.

DETAILED DESCRIPTION

Overview

Figure 1:
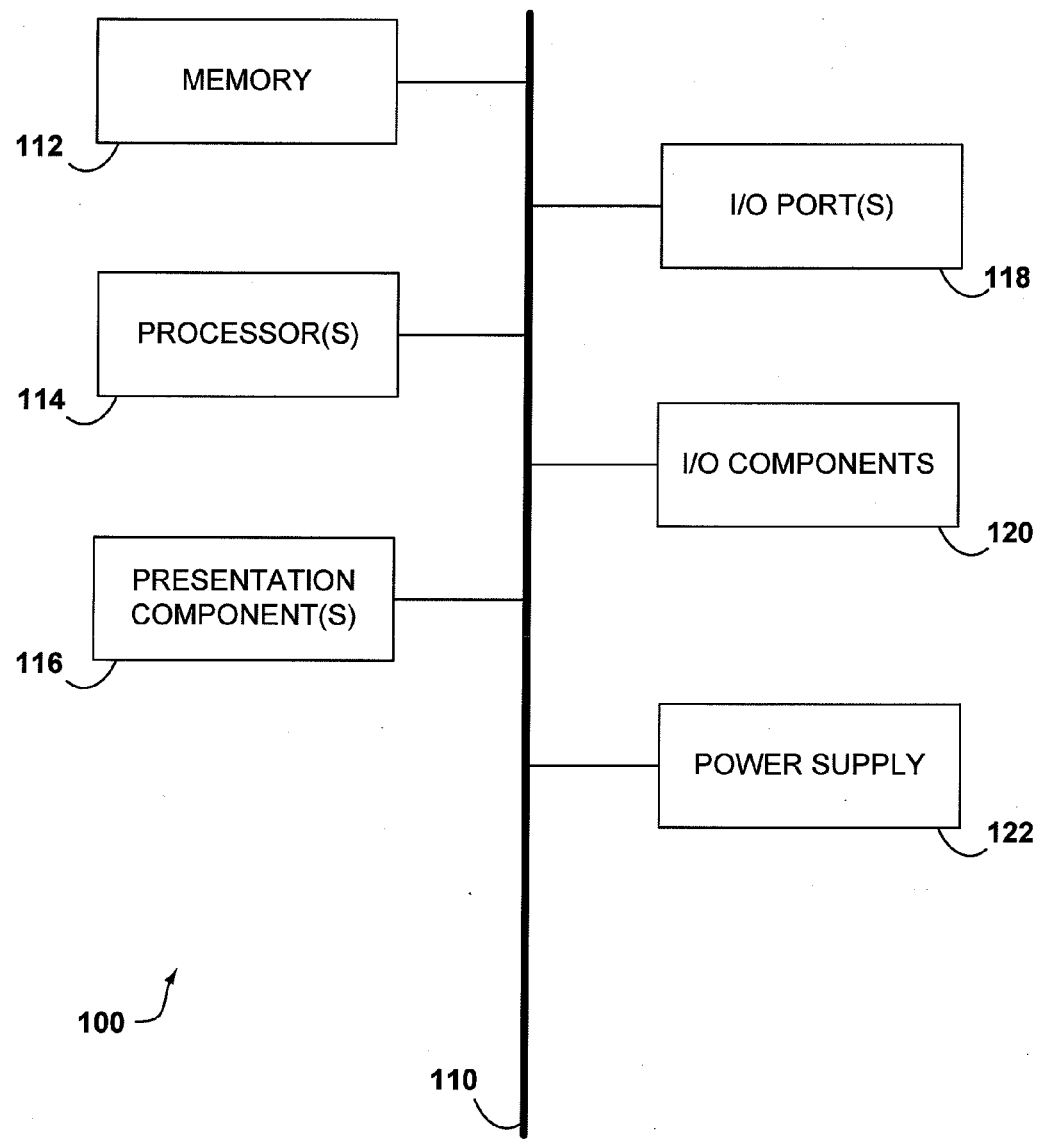
FIG. 1 is a block diagram of an exemplary computing environment suitable for use in implementing embodiments of the present invention.

For an image search based on conventional techniques, image search results may be displayed in a manner similar to the display method for text based documents. An initial results page can provide a series of matching images, with the highest ranked image at the top of the page, and lower ranked images becoming available as the user scrolls to the bottom of the page and/or accesses subsequent pages of results. This type of conventional search display does not allow a user to modify the nature of the search while scrolling through the results. Instead, when a new search is submitted or a link for a suggested search is accessed, the current listing of images is replaced with a new listing. Additionally, the conventional presentation of results does not assist the user in viewing the results. The only organization provided is the ranking relative to the search request.

In various embodiments, methods and user interfaces are provided for organizing image search results. The image search results can be presented so that the user can transition from an initial set of search results to a related set of results by translating the results along one or more display axes. As a user continues to translate the results, results for additional related searches can be presented. Optionally, some display axes can be used for organizing the search results based on an image feature. To increase the number of dimensions or axes available, in some embodiments the user interface can provide some search results as representative results, with additional results being available after selecting a representative result. Selecting the representative result can allow the user to "zoom in" and access a second layer of results organized by display categories.

In some embodiments, the image search results can be presented to the user in a manner that automatically allows the viewer to browse the results. This can include translating the results into and out of the field of view of the user along an axis. Optionally, the results can be organized in a non-aligned manner, so that results are grouped together without appearing to explicitly be in a standard column or row. The user can modify the speed and/or direction of translation to allow more detailed viewing of a particular result, or to more rapidly view and browse additional results.

Definitions

In the discussion below, a "display axis" refers to one of a plurality of axes used for displaying search results. A common example of a plurality of display axes is the use of orthogonal axes, such as a horizontal axis and a vertical axis for organizing a square grid of results. Sometimes the horizontal axis can be referred to as an "X" axis while the vertical axis is referred to as a "Y" axis. However, any convenient combination of axes in the plane of a display screen can be used, so axes that are rotated 45 degrees relative to the typical horizontal and vertical axes could equally be used. More generally, in two dimensions rectangular, rhomboid, and hexagonal grids could also be used. Note that while orthogonal axes are convenient for distinguishing between the display axes, strict orthogonality is not necessary. Axes that have an approximately orthogonal relationship can also be sufficient to allow a user to select one display axis for translation without causing translation along a second axis.

Although current display technology is typically a two-dimensional screen, techniques are well known for giving the appearance of a third dimension of depth into the display screen. An appearance of a third dimension can be generated, for example, by controlling the size of objects displayed and use of "perspective" techniques. This apparent third dimension can, for example, be a dimension that appears to have an axis that is approximately orthogonal to the viewing plane of a display device. In the discussion below, display axes that make use of this apparent third dimension will be referred to in the same manner as display axes that only make use of the dimensions in the viewing plane of the display device. Thus, in some embodiments, the plurality of axes can be selected that represent three (optionally orthogonal or approximately orthogonal) axes for display. While a horizontal, vertical, and depth axis provide one convenient choice for three display axes, any other convenient combination of axes can also be used.

Use of the apparent depth in the display can also be used to generate alternative display axes. For example, the axes can be selected to provide display axes that correspond to an infinite cylinder. In this type of coordinates, one axis represents a linear axis, such as a horizontal or vertical axis. The second axis can represent an angular axis that gives the appearance that the results are located on a curved cylinder. In a mathematics textbook, such an axis might be referred to by the variable "θ". In order to view more results, the cylinder can be translated along the horizontal or vertical axis, or the cylinder can be rotated around the angular axis. Note that the results may not be displayed on a true cylinder, as the apparent angle of curvature may not literally correspond to the number of results available for display. (In other words, the number of results available for display does not have to be limited to the number that would fit on an actual cylinder having the same apparent radius.) Also, in the limiting case, a cylinder of nearly infinite radius would result in a viewing experience for the user that would not be distinguishable from having a horizontal or vertical axis as described above.

Although orthogonal axes are often convenient choices, this is not required. For example, a hexagonal grid can be used. This would result in three possible display axes in the viewing plane of a display screen.

In the discussion below, results can be ordered along a display axis. Ordering of results along a display axis refers to organizing the results based on some feature or property. For example, one display axis can be used to order results based on relevance to a given search query. In this situation, movement along one direction of the display axis will correspond to results with higher relevance, while moving in the opposite direction will correspond to results with lower relevance. Another option for ordering results along a display axis can be to order results based on related searches. In this situation, one set of results can correspond to the current search query. These results can be displayed centrally relative to the display axis. In either direction along the display axis, results that are responsive to related searches can be displayed. Still other options can include ordering results based on a feature of the image, such as ordering results based on whether the results are color versus black and white, or ordering based on the size of the image.

In the discussion below, image results that are ordered along a display axis may described as being displayed in an aligned or non-aligned manner. Results displayed in an aligned manner correspond to results that have some type of linear feature along the corresponding display axis. For example, consider a typical grid of thumbnail images ordered along the horizontal and vertical axes of a display screen, where each thumbnail has the same size. In this situation, the thumbnails in the grid are likely to be aligned along both the horizontal and vertical display axes, as some type of common point in each thumbnail will form a line along the corresponding axis. Alignment of results can be determined using any convenient metric. For example, results ordered along a vertical axis can be aligned based on alignment of the left edges of the images, the center-points of the images, the right edges of the images, or aligned based on any other convenient point in the images.

Alternatively, results that are ordered along a display axis may be ordered in a non-aligned manner. For example, consider a group of images that are ordered in a non-aligned manner along a vertical axis based on relevance of the result to a search query. Based on the ordering, in this example results with a higher relevance will appear at a higher position along the vertical axis, while results with a lower relevance will appear at a lower position. The results will be confined within some horizontal region for display, but the boundaries for this region may not be visible on the display. Within the horizontal boundaries, the results can be displayed in any convenient horizontal location, so long as the appropriate vertical ordering is maintained. Within the boundaries, the non-aligned results may be located based on a pattern, such as a sinusoidal curve, or the horizontal location of the results may be random. However, the ordered results will lack a linear relationship between common points on the images.

In the discussion below, "translating" or "translation" of results refers to moving displayed results along one or more display axes. This will cause some new results to enter the field of view, while other results may be removed from the field of view. For example, translation of results along a vertical display axis can cause some new results to appear at the top/bottom of a display screen, while other results exit the display screen from the bottom/top. For translation along a display axis into or out of the plane of a display screen (such as a "depth" display axis), translation can result in objects changing size. For translation into or out of the plane of the display screen, planes can also be defined in the "depth" direction beyond which an image is no longer displayed. For example, one plane can correspond to a back plane, where images are considered too far away and therefore are no longer rendered. Another plane can be a front plane where images are considered to be too far forward for view, as if the viewer of the display device had walked past the image so that the image is behind the viewer.

Related Searches

In various embodiments, one or more display axes can be used to organize search results based on related searches. In many situations, one display axis can be used for related searches, but a plurality of display axes can also be used. As an example, consider a situation where a horizontal display axis is used to provide related searches. In this example, an initial search query is provided of "George Washington". This generates a variety of image results, with the highest ranked results corresponding to images of the first U.S. president.

Based on the initial search query, related queries can be generated or identified by any convenient method. Two of the related queries can be selected for use. These selected related queries can be ordered along the horizontal axis, typically on either side of the initial query. The selected related queries can be the highest ranked related queries, or any other convenient method can be used for selecting the related queries. The related queries can be used to generate responsive image results. These results are displayed on either side of the results for the initial query. In this example, the related search queries can lead to display of results responsive to "Martha Washington" to the right along the horizontal axis and results responsive to "John Adams" displayed to the left.

Figure 3:
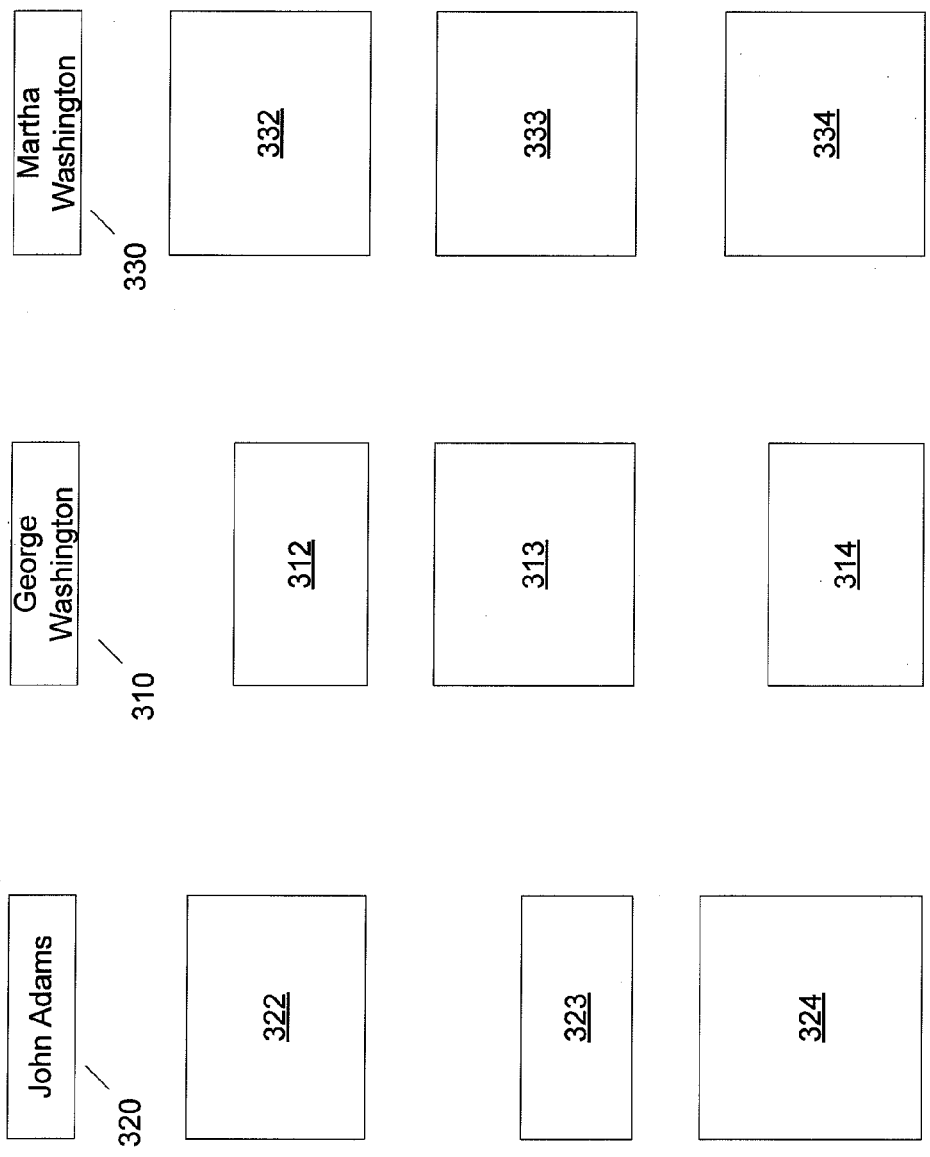
FIG. 3 schematically shows a display of ordered, aligned results according to an embodiment of the invention.

FIG. 3 schematically shows a possible representation of the above example. In FIG. 3, three columns of results are presented. The middle column corresponds to the current search query 310 of "George Washington." In the middle column, three representative results 312, 313, and 314 are schematically shown. The vertical axis in this example corresponds to relevance of the search results to the query. Any convenient number of results can be displayed in the viewing area at one time. Depending on the size of the display screen and the size of the images, the number of results displayed along an axis can be at least one, or at least 3, or at least 5, or at least 7, or any other convenient number. In this example, additional responsive results beyond the initially displayed results are available by translating the results along the vertical axis. The left and right columns correspond to related search query 320 for "John Adams" and related search query 330 for "Martha Washington". These columns show representative results 322-324 and 332-334. Again, additional results for queries 320 and 330 are also available by translating along the vertical display axis. In this example, the displayed image results have been scaled so that each displayed result has the same width. The results have then been aligned in the vertical direction based on the left edge of the displayed images. The right edge of the image, center of the image, or any other location in the images could have been used instead. The displayed images are also aligned along the horizontal direction by aligning the bottom edge of images. As a result, the example in FIG. 3 provides an ordered representation for the displayed images that is aligned along both display axes.

Figure 4:
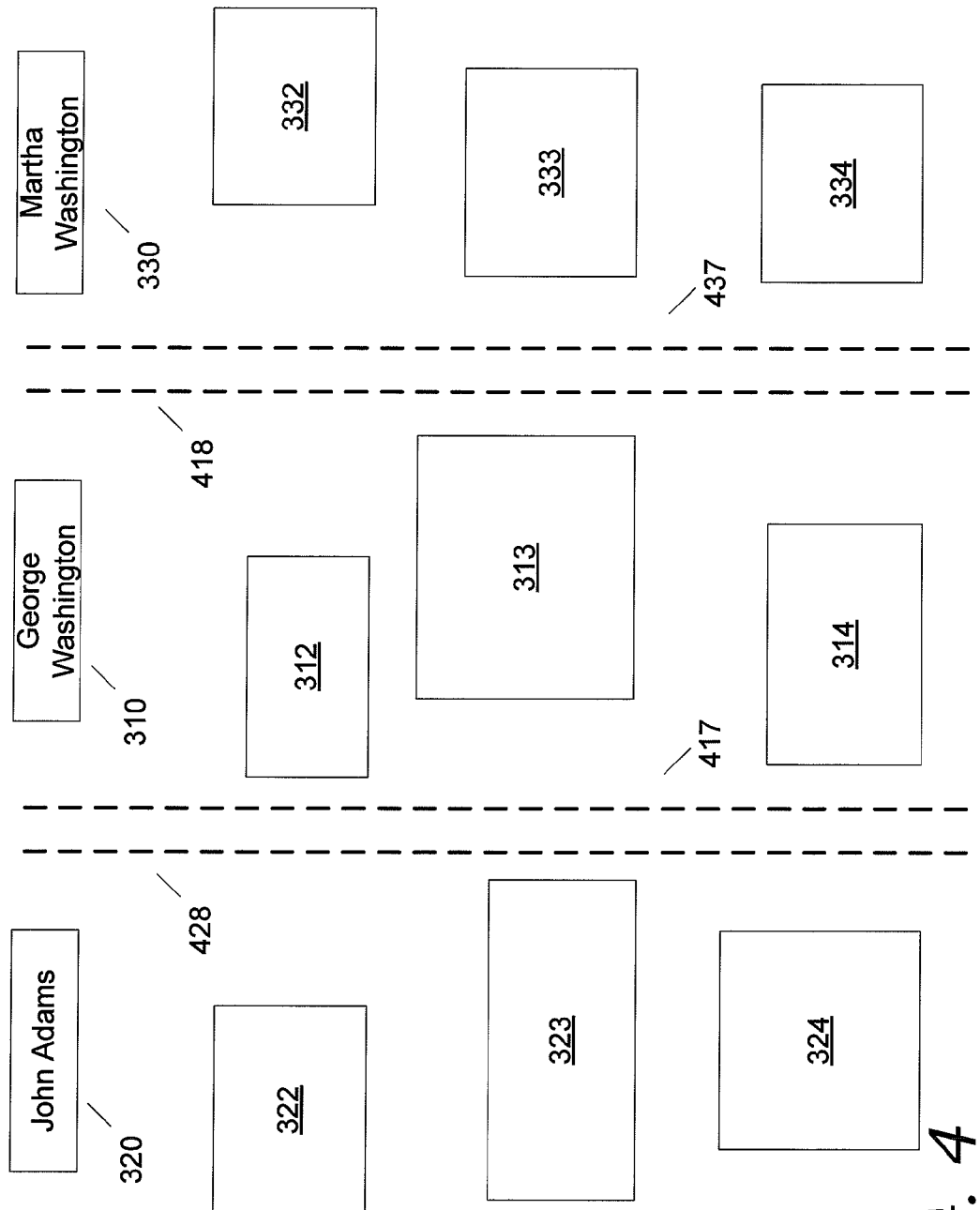
FIG. 4 schematically shows a display of ordered results aligned along some display axes according to an embodiment of the invention.

FIG. 4 schematically shows an alternative format for displaying image results. The same searches 310, 320, and 33 are shown in FIG. 4. The responsive results are also the same, and the alignment of the results along the horizontal axis has been maintained. However, FIG. 4 shows an embodiment where the results are not aligned along the vertical axis. Instead, the images in each column are ordered, but the horizontal location within the column can be any convenient location. The scaling requirement of the images has also been removed, so that the images may each have any size that is convenient for display.

In embodiments such as FIG. 4, where image results are displayed in a nonaligned manner, the boundaries for display of results along a non-aligned axis can be selected in any convenient manner. In FIG. 4, the boundaries 417 and 418 for display of the "George Washington" column are distinct from the boundaries 428 and 437 for display for the adjacent related search columns. Another option can be to have shared boundaries, so that boundary 418 and boundary 437 would be in the same location.

Still another option can be to have boundaries that allow for overlap of adjacent results. Under this type of option, boundary 417 could be the right hand boundary for the "John Adams" results while boundary 428 could be the left hand boundary for the "George Washington" results. In this type of option, the overlap in display areas for results may help in giving the feel of a smooth transition from one set of results to another.

After seeing the display of results, a user may decide that the image results for "John Adams" look interesting. The user can translate the results along the horizontal axis so that the results for John Adams become the central query. This leads to several changes in the display. As the results for John Adams are moved to the center, the results for George Washington become the related search to the right while the results for Martha Washington are moved off of the page. In some embodiments, the fact that Martha was originally displayed can be tracked, so that the user can always return to a previously viewed display. As the John Adams results move to the center, another related search also becomes visible. In this example, the highest ranked related search is George Washington. However, that result has already been selected for display during this session. (In this embodiment, even if the results for George Washington were no longer visible, George Washington would not be selected as the related search because it was used at some point during the search session.) Instead, the next highest ranked related search of "Thomas Jefferson" is selected, and results responsive for "Thomas Jefferson" are displayed to the left of John Adams.

FIG. 5 schematically shows the translation along the horizontal axis to change the central search. FIG. 5 is based on the aligned result display shown in FIG. 3. In FIG. 5, the translation has moved the "John Adams" part of the way toward being the central search query. As a result, the results 542-544 for the "Thomas Jefferson" related query 540 are partially visible while the results for the "Martha Washington" related query 330 are leaving the viewing area. Note that there is no requirement that the "John Adams" result is moved fully to the central position. If the user prefers the view displayed at the point in time corresponding to FIG. 5, or at any other convenient time, the user can stop the translation. Alternatively, the user can modify the rate of translation to move more quickly or more slowly through the results.

By translating in the horizontal direction, the user can continue to receive new related search results. In embodiments where previously selected related searches are excluded, this can lead to a seemingly infinite browsing experience. For example, translating the results to make Thomas Jefferson the central search query could result in an adjacent related search of "U.S. historical documents". As noted above, the history of related searches can also be tracked. In an embodiment where the history of related searches is tracked, translating the view back to "George Washington" would also bring the related search of "Martha Washington" back into the display view.

Based on the above, a variety of other features can be incorporated. For example, a user may be interested generally in related searches, but the particular related searches provided may not be of interest. In an embodiment, a user can choose to have one or both displayed related searches replaced with alternative related searches. For example, replacing both related searches could lead to the new related search "Revolutionary War" appearing to the left on the horizontal display axis while "George Washington Carver" appears to the right. This can be repeated as desired, until the user receives related search queries of interest. If a user requested new related searches, depending on the user settings, the search queries for "John Adams" and "Martha Washington" can be excluded from being used as related searches, or they can now appear in the related search chain if they are they are identified as the next related search query. A user can also provide a new main search query at any time. Related searches based on the new search query can then be provided. The user can be given an option to exclude previously viewed search queries from being selected as a related query to the new search query, or a default behavior can be chosen by the system.

Another potential variation can be to have a one or more default or recommended initial search queries. For example, a museum may provide initial search queries based on the current contents of the museum collection. The related queries could optionally be defined in advance for each query. This would allow a user of the museum search to be able to scroll through the museum collection in an ordered manner without having to know anything about the collection. The user can simply select an initial query of interest and start browsing.

Still another option can be to allow the user to modify a search query by selecting an image. In an embodiment, each image can have a search query associated with the image. When a user selects an image, the user can optionally indicate an interest in more images similar to the selected image. The search query associated with the image can then be used as a new initial query.

Display Axes Based on Features

In addition to providing related searches, one or more display axes can be based on a characteristic or feature of the image results. Examples of image features for ordering the display of the images can include the size of the image; whether the image is color or black and white; the brightness or color characteristics of the image; a date associated with the image; or any other convenient characteristic of the image. Images ordered along a display axis based on a feature may be aligned or non-aligned.

Unlike the potentially "infinite" browsing possible for display axes corresponding to related searches, the display axes for an image feature may be finite. For example, a display axis for color versus black and white images may be small enough to have the entire display axis on the display screen. More generally, the amount of translation available for a display axis can be as much or as little as is convenient for displaying the associated images.

Although not explicitly a "feature" of an image, relevance of an image to a search query can also be used as a display axis for ordering the images. In an embodiment, the images can be ordered along a display axis based on relevance such that the initial display to the user includes the most relevant images for the search query. A display axis for ordering search results by relevance may also be limited in the amount of translation that is possible. Since the display may start with the most relevant results being visible, initially it may only be possible to translate along the relevance display axis in one direction.

In another embodiment, ordering images along display axes based on features can be a second level of display after an initial image has been selected. For example, consider a situation where an initial search is displayed with two display axes for related searches. In this type of configuration, a limited number of images can be displayed associated with each search or related search. Selecting an image can identify a search or related search for an expanded display. This expanded display can provide additional images for the query corresponding to the selected image, and the images can be ordered along one or more display axes based on the features or characteristics of the images.

Automatic Translation along Display Axes

When image results are displayed to a user, one option is to provide a static initial view and then allow translation of the results along one or more of the display axes based on user input. In other embodiments, image results can be automatically translated along one or more of the display axes for viewing by the user. The automatic translation of image results can begin when results are displayed, or the automatic translation can be activated during review of results by the user. Depending on the embodiment, the user can provide input to set the rate of translation along each display axis, or a translation rate can be selected automatically. In another embodiment, the automatic translation process can be guided in any convenient manner. For example, the direction for automatic translation can be guided in part by a random process, or by a process based on stored navigational histories of a current user, or by a process based on stored navigational histories of a plurality or group of users, or by relevance, or by a process based on another convenient factor. Still another option can be to use a combination of two or more types of processes to guide the navigation for automatic translation.

During automatic translation of results, a user may identify an image of interest. Based on user input, one or more actions may be performed when an image is selected. The automatic translation of images may be stopped or slowed when an image is selected. The user can be provided with a larger view of the image and/or additional information about the image. Optionally, the user can submit a new search query based on keywords associated with the image. The selected image can also be added to a library or collection of images selected by the user. The library of selected images can provide the user a convenient way to return to images of interest after the images are no longer in view on the display.

EXAMPLE

Fully Non-Aligned View

FIGS. 6-9 provide another example of display of image results according to various embodiments of the invention. In FIGS. 6-9, results are ordered along three display axes. A horizontal display axis is used for ordering results based on search query. The vertical axis is used for ordering results based on the size of the image. The "depth" axis into and out of the plane of the display screen is used for ordering based on relevance of a result to a query.

Figure 6:
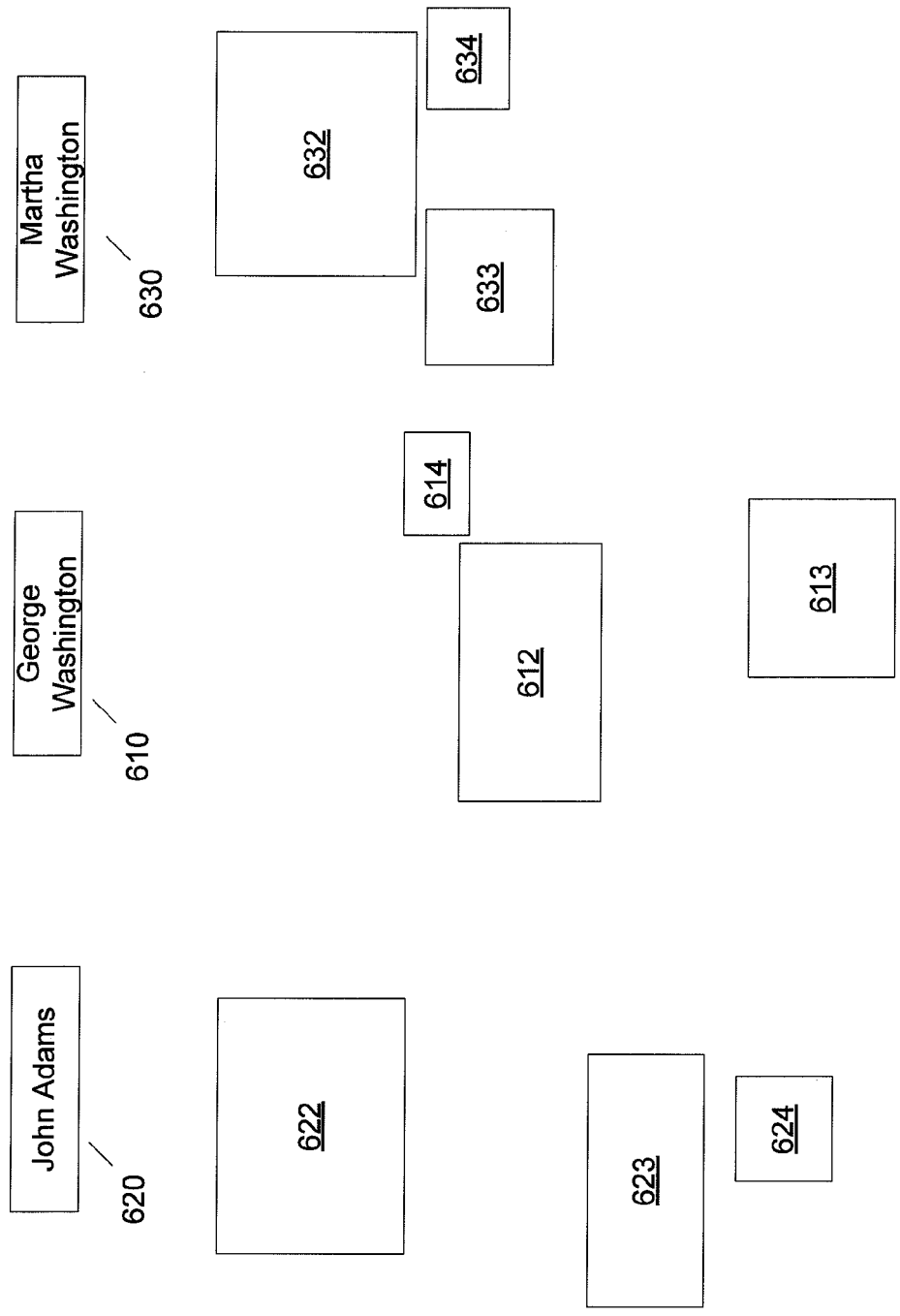
FIG. 6 schematically shows a display of ordered, non-aligned results according to an embodiment of the invention.

FIG. 6 provides the initial view based on a received search query 610 of "George Washington". In the embodiment shown in FIG. 6, the results are not aligned along any of the display axes. Instead, the results 612-614 are randomly scattered in a manner otherwise consistent with the ordering along each display axis. The results 622-624 responsive to query 620 and results 632-634 responsive to query 630 are similarly scattered. Qualitatively, this can give the viewer a feeling of object suspended in a medium that can flow through the viewer's field of vision.

In the initial view shown in FIG. 6, the highest ranked results 612, 622, and 632 are displayed as the closest objects in the field of view. The next few lower ranked images are smaller as the objects appear to recede into the page. Along the vertical display axis, images are organized based on the actual size of the image. By chance, the highest ranked image results 633-634 for "Martha Washington" query 630 have a similar size in this example.

Figure 7:
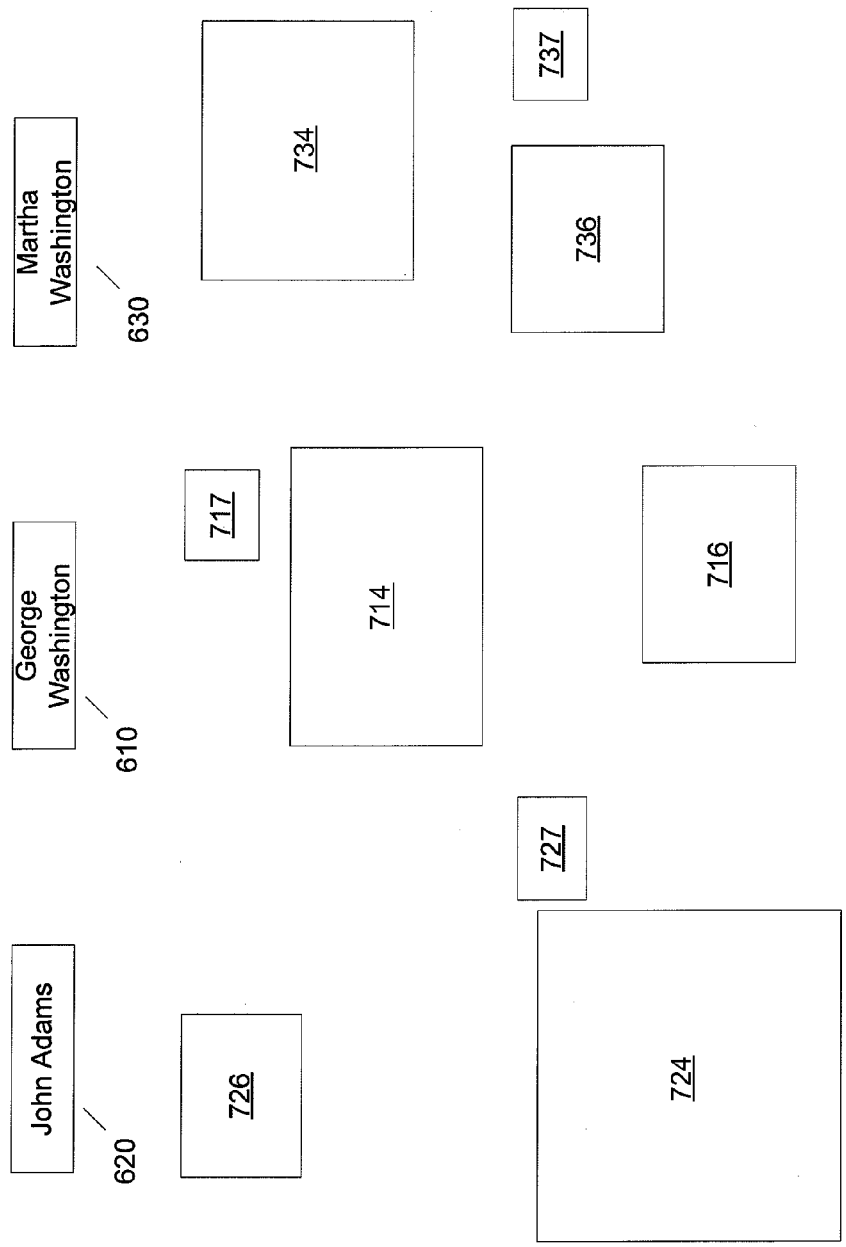
FIG. 7 schematically shows display of ordered, non-aligned results after translation along a display axis.
Figure 8:
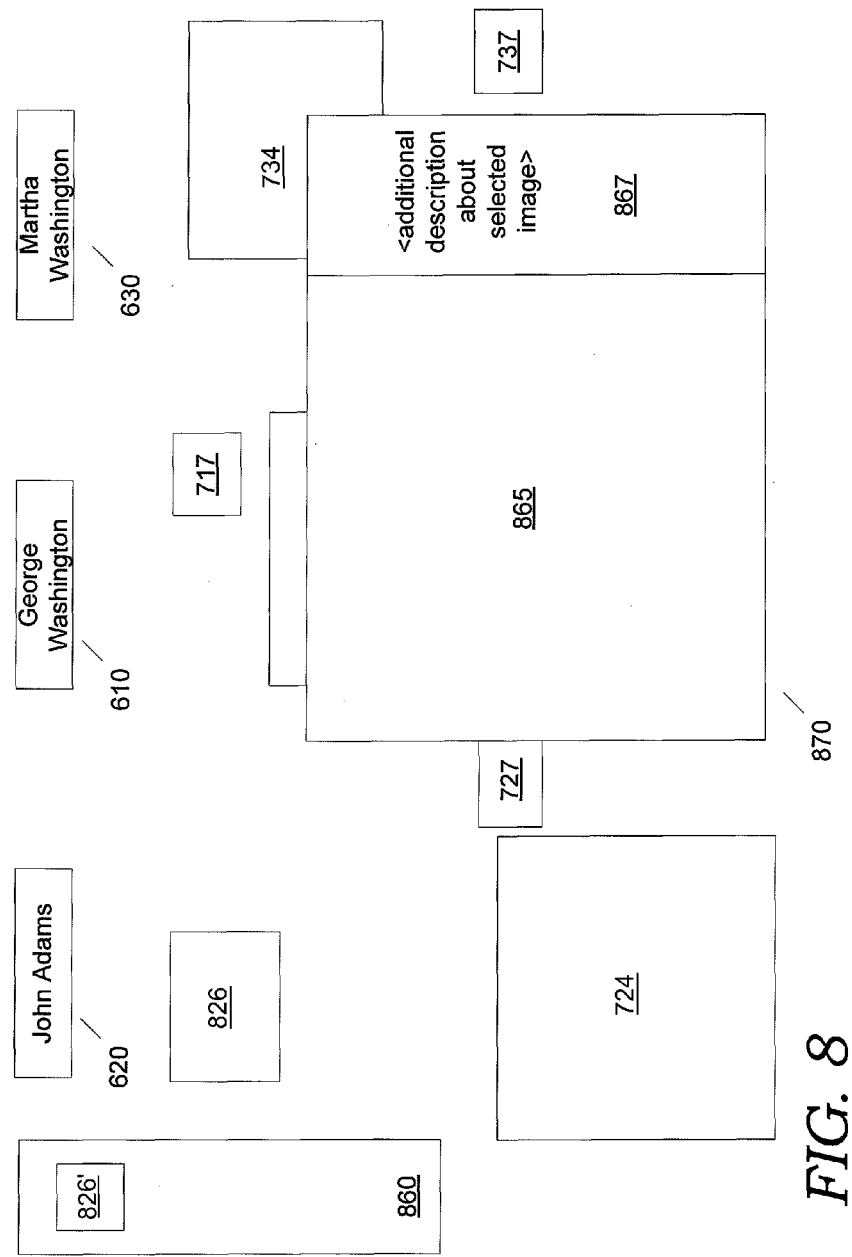
FIG. 8 schematically shows additional user interface features for viewing selected images and maintaining a history of selected images.

In this example, after the query is received, the results are automatically translated along the "depth" display axis. This allows the user to begin browsing the results for the center query and the related queries without any further user action. The user may alter the direction or speed of translation at any time, or the user can halt the translation. FIG. 7 schematically shows the display of results after some translation of the results has occurred along the "depth" display axis. In FIG. 7, the two highest ranked results for the center search and the related searches have passed beyond the viewing plane. This leaves images 714, 724, and 734 as the highest ranked displayed images. These images also have the largest display size at this time. New images 716-717, 726-727, and 736-737 have also come into view as lower ranked results that are visible due to translation along the "depth" display axis.

At this point, the user identifies image 826 as being of interest. In the embodiment shown in FIG. 8, this causes the automatic translation to stop while the user reviews the selected image. This also adds the selected image 826 to a library 860 of selected images. When an image is selected, the user can be presented with a larger view 865 of the selected image 826, as well as additional information 867 about the selected image 826. The larger image view 865 and additional information 867 can be presented as an overlay to the image results, or they can optionally be displayed in a separate window 870.

Figure 9:
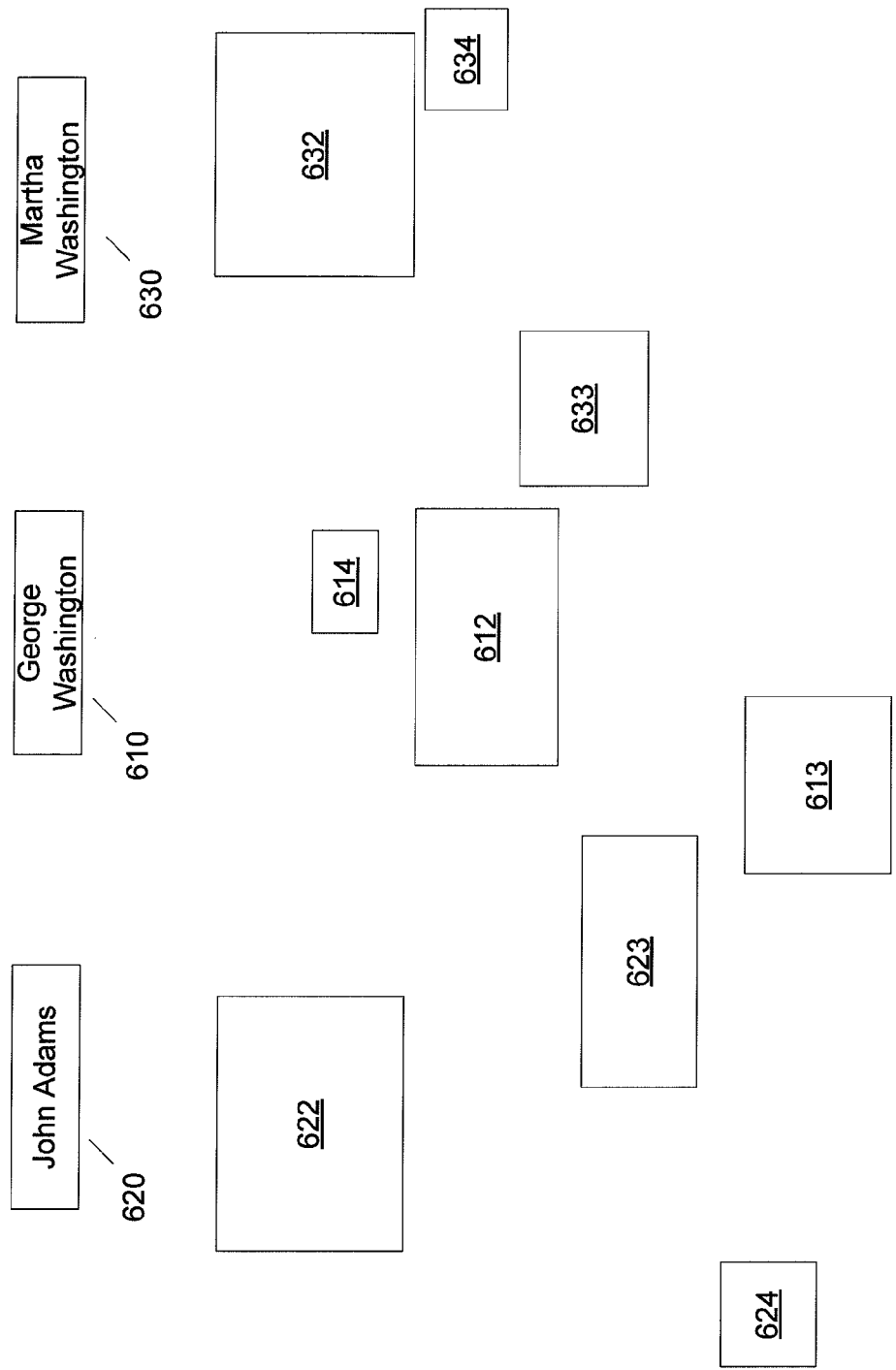
FIG. 9 schematically shows an alternative method for display of ordered, non-aligned results according to an embodiment of the invention.

FIG. 9 schematically shows a variation for how to display results. FIG. 9 is generally similar to the display in FIG. 6. The relationship between the center search query and the related search queries is modified. In FIG. 9, the ordering of results along the horizontal axis indicates not only which search query a result is associated with, but also how the result is ranked in relation to one of the related queries. For example, in FIG. 6, result 633 was the second highest ranked result for "Martha Washington". In FIG. 9, result 633 is shown roughly halfway between the query for "George Washington" and "Martha Washington". In the embodiment shown in FIG. 9, this indicates that result 633 also has a high ranking in response to the "George Washington" query. By contrast, result 612 is not considered responsive to either the "John Adams" query or the "Martha Washington" query. Thus, result 612 is shown as being centrally located under the "George Washington" query. In other embodiments, another way to attempt to smooth the transition between the results for two adjacent queries would be to explicitly generate results for a search query that is based on a pair of adjacent queries. Thus, a combined query of "John Adams and George Washington" or "Martha Washington and George Washington" could be used to generate responsive image results. These results for a combined query can be shown between the explicitly identified center query and the related query. Still another option can be to use both horizontal positioning and explicit combined queries to provide a smooth transition from an initial query such as "George Washington" to a related query such as "Martha Washington".

User Interface

Any convenient set of controls can be provided to allow a user to translate along the various display axes. One option can be to provide keyboard based controls. As an example of possible key assignments, the arrow keys on a keyboard can be used to increase or decrease speed in the plane of the display screen, while the "plus" and "minus" keys can modify the speed of translation along the depth display axis. For convenience, a key such as the space bar could be used to stop all motion. Another option could be to use a combination of mouse movement and clicks of mouse buttons. Still other options could be based on touch screen interactions by a user.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, applications, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In an embodiment, the computer storage media can be selected from tangible computer storage media. In another embodiment, the computer storage media can be selected from non-transitory computer storage media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
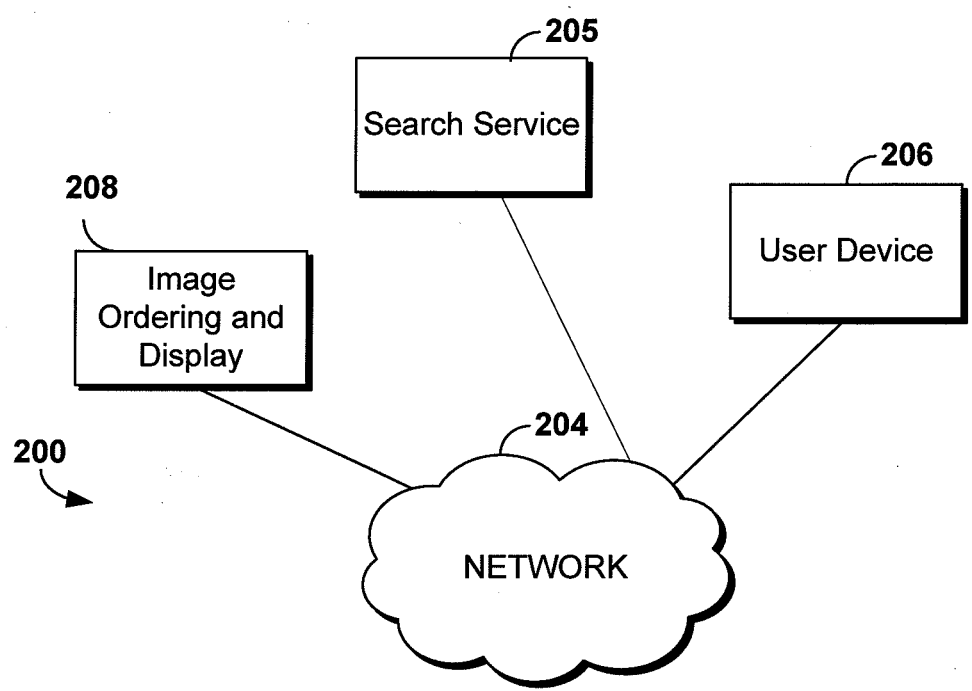
FIG. 2 is a block diagram of an exemplary network environment suitable for use in implementing embodiments of the present invention.

Turning now to FIG. 2, a block diagram is illustrated, in accordance with an embodiment of the present invention, showing an exemplary computing system and/or network environment 200. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 206, a search engine or search service 205, and an image ordering and display component 208, all in communication with one another via a network 204 and/or via location on a common device. The network may include, without limitation, one or more local area networks (LANs) and/or wide area networks (WANs). Such networking environments are commonplace in offices, enterprise-wide computer networks, intranets and the Internet. Accordingly, the network 204 is not further described herein.

Each of the user device 206, search engine 205, and image ordering and display component 208 shown in FIG. 2 may be any type of computing device, such as, for example, computing device 200 described above with reference to FIG. 2. By way of example only and not limitation, each of the user device 206, search engine 205, and image ordering and display component 208 may be a personal computer, desktop computer, laptop computer, handheld device, mobile handset, consumer electronic device, and the like. Additionally, the user device 206 may further include a keyboard, keypad, stylus, joystick, and any other input-initiating component that allows a user to provide wired or wireless data to the network 204, e.g., verification inquires, web page addresses, and the like. It should be noted, however, that the present invention is not limited to implementation on such computing devices, but may be implemented on any of a variety of different types of computing devices within the scope of embodiments hereof.

Based on search queries, search engine or service 205 can identify responsive results. Image ordering and display component 208 can then order the responsive image results and provide a display view for user device 206 in accordance with various embodiments of the invention.

Figure 10:
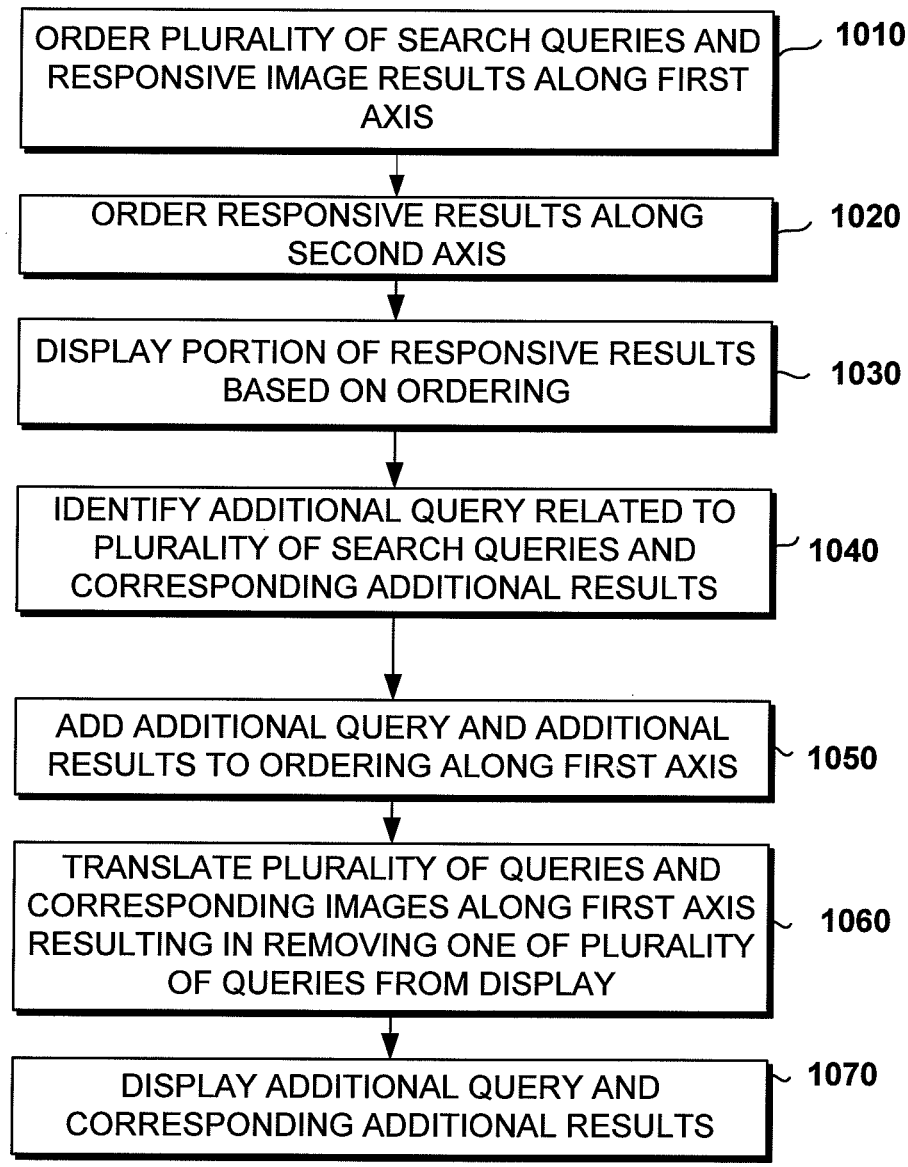
FIGS. 10-12 depict flow charts of various methods according to embodiments of the invention.

FIG. 10 depicts a flow chart showing a method according to an embodiment of the invention. In FIG. 10, a plurality of search queries and corresponding responsive image results are ordered 1010 along a first display axis. The responsive image results are also ordered 1020 along a second display axis. The ordering along the second display axis can be based on, for example, a ranking of the results relative to the corresponding query, or an image feature, or another characteristic. If the ordering is based on an image feature, the image feature can be the size of the image, whether the image is color or black and white, a date associated with the image feature, or any other convenient image feature. A portion of the responsive results are displayed 1030 based on the ordering of the results along the display axes. An additional query related to at least one of the plurality of search queries is identified 1040, along with corresponding additional results responsive to the additional query. The additional query and the additional results are ordered 1050 along the first display axis. Typically, the additional query will be ordered to be adjacent to the query that it is related to in the plurality of queries. The plurality of queries and corresponding responsive image results are translated 1060 along the first display axis. This results in removing one of the plurality of queries from display. The translation also creates space in the display view, and this space can be used to display 1070 the additional query and corresponding additional results.

Figure 11:
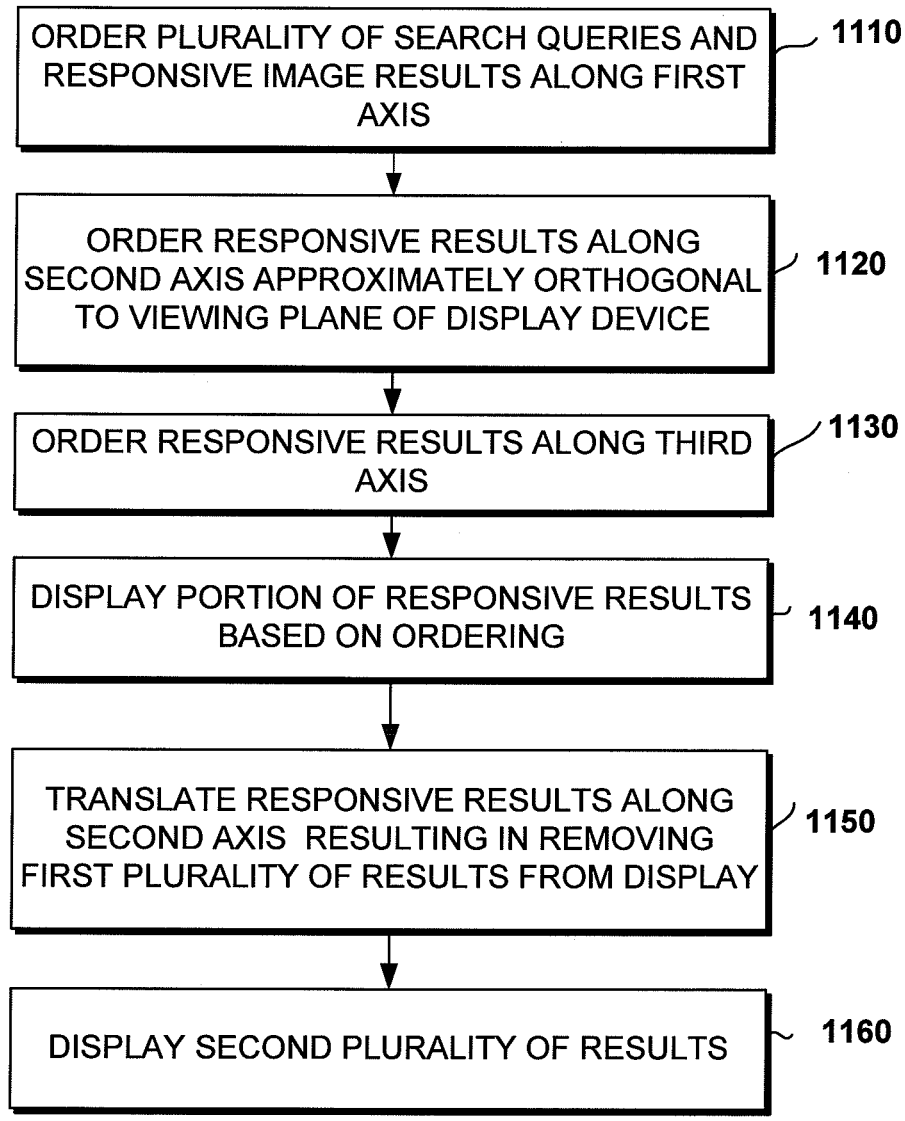

FIG. 11 depicts a flow chart showing a method according to another embodiment of the invention. In FIG. 11, a plurality of search queries and corresponding responsive image results are ordered 1110 along a first display axis. The responsive image results are also ordered 1120 along a second display axis. This second display axis is approximately orthogonal to the viewing plane of the display device. The ordering along the second display axis can be based on, for example, a ranking of the results relative to the corresponding query, or an image feature, or another characteristic. If the ordering is based on an image feature, the image feature can be the size of the image, whether the image is color or black and white, a date associated with the image feature, or any other convenient image feature. The responsive image results are also ordered 1130 along a third display axis. A portion of the responsive results are displayed 1140 based on the ordering of the results along the display axes. The responsive image results are translated 1150 along at least the second display axis. This results in removing a first plurality of responsive results from display. The translation also creates space in the display view, and this space can be used to display 1160 a second plurality of results.

Figure 12:
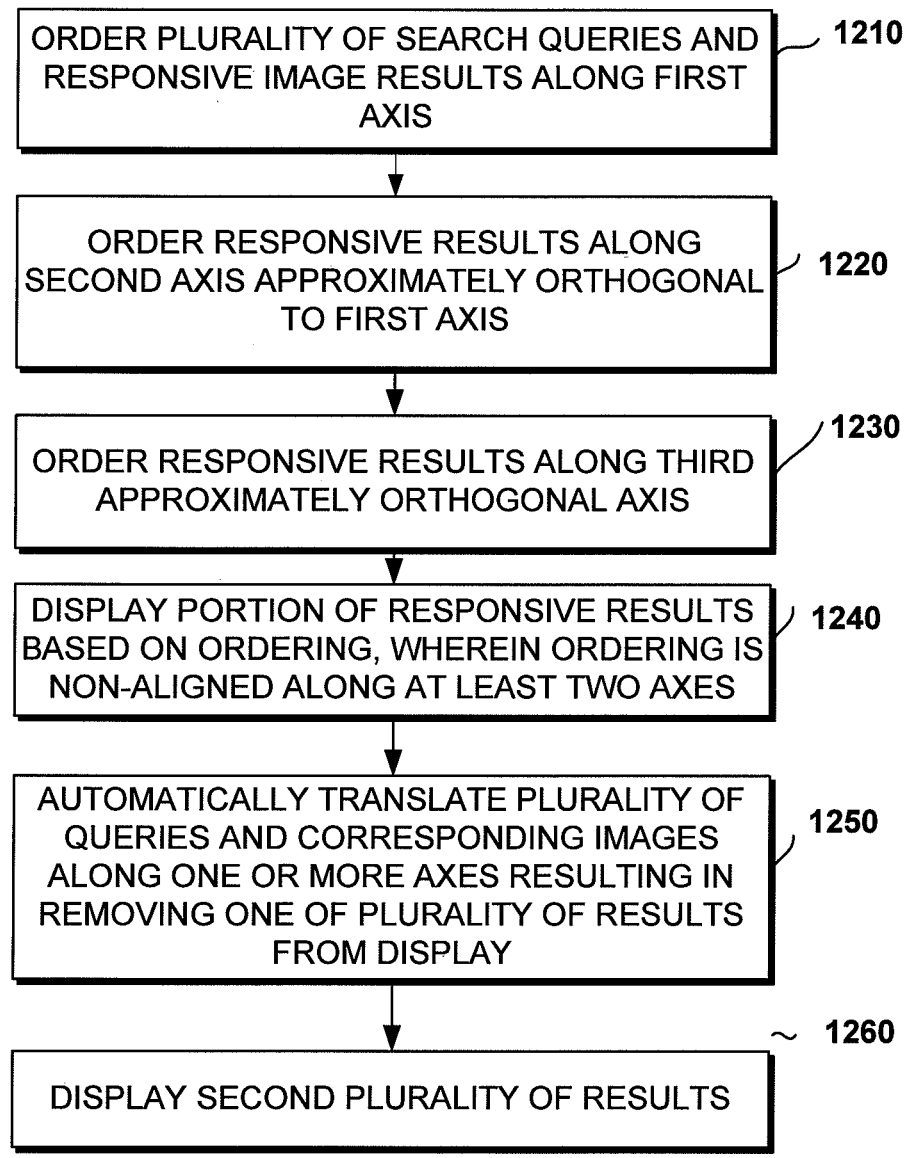

FIG. 12 depicts a flow chart showing a method according to another embodiment of the invention. In FIG. 12, a plurality of search queries and corresponding responsive image results are ordered 1210 along a first display axis. The responsive image results are also ordered 1220 along a second display axis. This second display axis is approximately orthogonal to the first display axis. The responsive image results are also ordered 1230 along a third display axis based on an image feature. The third display axis is approximately orthogonal to the first and second display axes. A portion of the responsive results are displayed 1240 based on the ordering of the results along the display axes. In FIG. 12, the results are ordered along at least two of the display axes in a non-aligned manner. The responsive image results are automatically translated 1250 along one or more of the display axes. This results in removing a first plurality of responsive results from display. The translation also creates space in the display view, and this space can be used to display 1260 a second plurality of results.

Additional Embodiments

In an embodiment, one or more computer-storage media storing computer-useable instructions are provided that, when executed by a computing device, perform a method for displaying image results. The method includes ordering a plurality of search queries and corresponding responsive image results along a first display axis; ordering the responsive image results along a second display axis; displaying at least a portion of the responsive results based on the ordering along the first and second display axes; identifying an additional query related to at least one of the plurality of search queries and a corresponding plurality of additional responsive image results; adding the additional query and the corresponding additional responsive image results to the ordering of search queries along the first display axis; translating the plurality of queries and the corresponding responsive image results along the first display axis, the translation resulting in removing one of the plurality of queries from display; and displaying the additional query and the corresponding additional responsive image results.

In another embodiment, a method for displaying image results is provided. The method includes ordering a plurality of search queries and corresponding responsive image results along a first display axis; ordering the responsive image results along a second display axis, the second display axis being approximately orthogonal to a viewing plane of a display device; ordering the responsive results along a third display axis; displaying at least a portion of the responsive results based on the ordering along the first, second, and third display axes; translating the responsive results along at least the second display axis, the translation resulting in removing a first plurality of responsive results from display; and displaying of a second plurality of responsive results.

In still another embodiment, one or more computer-storage media storing computer-useable instructions are provided that, when executed by a computing device, perform a method for displaying image results. The method includes ordering a plurality of search queries and corresponding responsive search results along a first display axis; ordering image results responsive to the plurality of queries along a second display axis, the second display axis being approximately orthogonal to the first display axis; ordering the responsive results along a third display axis, the third display axis being approximately orthogonal to the first display axis and the second display axis; displaying at least a portion of the responsive results based on the ordering along the first, second, and third display axes; automatically translating the responsive results along one or more of the display axes, the translation resulting in removing a first plurality of results from display; and displaying a second plurality of responsive results, wherein the responsive results are ordered in a non-aligned manner along at least two display axes.

In yet another group of embodiments, a first embodiment can provide one or more computer storage media storing computer-useable instructions that, when executed by a computing device, perform a method for displaying image results. The method can include ordering a plurality of search queries and corresponding responsive image results along a first display axis; ordering the responsive image results along a second display axis; displaying at least a portion of the responsive results based on the ordering along the first and second display axes; identifying an additional query related to at least one of the plurality of search queries and a corresponding plurality of additional responsive image results, the additional query being different from the queries in the query history; adding the additional query and the corresponding additional responsive image results to the ordering of search queries along the first display axis; translating the plurality of queries and the corresponding responsive image results along the first display axis, the translation resulting in removing one of the plurality of queries from display; and displaying the additional query and the corresponding additional responsive image results.

In an second embodiment, computer storage media according to the first embodiment are provided, wherein a query history retains the ordering of queries along the first display axis for queries in the query history, and wherein identifying an additional query related to at least one of the plurality of search queries comprises identifying an additional query that is different from the plurality of search queries stored in the query history.

In a third embodiment, computer storage media according to any of the above embodiments are provided, wherein translating the responsive results along the first display axis comprises automatically translating the responsive results along the first display axis.

In a fourth embodiment, computer storage media according to any of the above embodiments are provided, further comprising: translating, after display of the additional query, the currently displayed queries and corresponding responsive results along the first display axis, the translation resulting in removing the additional query from display; and displaying the plurality of queries and corresponding responsive results.

In a fifth embodiment, one or more computer storage media storing computer-useable instructions are provided that, when executed by a computing device, perform a method for displaying image results. The method can include ordering a plurality of search queries and corresponding responsive search results along a first display axis; ordering image results responsive to the plurality of queries along a second display axis, the second display axis being approximately orthogonal to the first display axis; ordering the responsive results along a third display axis, the ordering optionally being based on an image feature, the third display axis being approximately orthogonal to the first display axis and the second display axis; displaying at least a portion of the responsive results based on the ordering along the first, second, and third display axes; translating the responsive results along at least the second display axis, the translation resulting in removing a first plurality of results from display; and displaying a second plurality of responsive results.

In a sixth embodiment, computer storage media according to the fifth embodiment are provided, wherein translating the responsive results along one or more display axes comprises automatically translating the responsive results along at least the second display axis.

In a seventh embodiment, computer storage media according to the fifth or sixth embodiment are provided, wherein the second plurality of responsive results comprises results with a ranking relative to the corresponding query that is lower than the ranking of results in the first plurality of responsive results.

In an eighth embodiment, computer storage media according to any of the above embodiments are provided, wherein the responsive results are ordered along the second display axis in a non-aligned manner.

In a ninth embodiment, computer storage media according to the eighth embodiment are provided, wherein the non-aligned responsive results are positioned along the first axis to reflect a ranking relative to an adjacent query.

In a tenth embodiment, computer storage media according to any of the above embodiments are provided, further comprising: identifying an intermediate query for a pair of queries in the ordered queries along the first display axis, the intermediate query being based on the pair of queries; obtaining results responsive to the intermediate query; and displaying the results responsive to the intermediate query between the results for the pair of queries.

In a eleventh embodiment, computer storage media according to any of the above embodiments are provided, wherein translating the responsive results comprises translating the responsive results along at least two display axes.

In a twelfth embodiment, computer storage media according to any of the above embodiments are provided, wherein the responsive results are ordered in a non-aligned manner along at least two display axes.

In a thirteenth embodiment, computer storage media according to the first embodiment are provided, further comprising ordering the responsive results along a third display axis based on an image feature.

In a fourteenth embodiment, computer storage media according to any of the above embodiments are provided, wherein the responsive results are ordered along the second axis based on a ranking of the results relative to the corresponding query.

In a fifteenth embodiment, computer storage media according to any of the above embodiments are provided, wherein the second display axis is approximately orthogonal to a viewing plane of a display device.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computing device, comprising:
   at least one processor;
   at least one display device; and
   at least one memory storing computer-readable instructions that when executed by the at least one processor cause the computing device to perform a method, the method comprising:
      receiving a first search query;
      displaying the first search query and a first set of results ordered along a first axis within a viewable area of the display device;
      automatically determining a second search query related to the first search query;
      displaying the second search query and a second set of results ordered along the first axis within the viewable area;
      providing at least three options for translating the viewable area, comprising:
         a first option for translating the viewable area along the first axis;
         a second option for translating the viewable area along a second axis that is substantially orthogonal to the first axis; and
         a third option for translating the viewable area along a third axis that is substantially orthogonal to the first axis and the second axis;
      receiving a selection of a result; and
      in response to receiving an indication of the third option and the selected result, translating the viewable area along the third axis, wherein translating the viewable area along the third axis comprises linear translation along the third axis to display a third set of results, wherein the third set of results are displayed in a ranked order of relevance based on the selected result, and wherein each successive result of the third set of results is displayed with decreasing size along the third axis based on decreasing relevance to the selected result.

2. The computing device of claim 1, wherein translating the viewable area along the third axis continues until an indication to stop the translating is received.

3. The computing device of claim 2, wherein a selection of a second result is an indication to stop translating the viewable area along the third axis.

4. The computing device of claim 1, wherein at least the first search query and the second search query are ordered along the second axis.

5. The computing device of claim 1, further comprising:
   displaying at least a third search query and a third set of results ordered along the first axis, and wherein the third search query is related to the first search query;
   receiving a selection of a result;
   automatically determining a fourth search query based on the selected result; and
   displaying the fourth search query and a fourth set of results ordered along the first axis in the viewable area, wherein the fourth search query was not previously displayed, wherein the fourth search query is not related to the first search query.

6. The computing device of claim 1, further comprising:
   displaying a third search query and a third set of results ordered along the first axis, wherein the third search query is related to the second search query and is not related to the first search query.

7. The computing device of claim 2, wherein the indication to stop translating the viewable area along the third axis is received as a gesture on a touch-enabled display device.

8. The computing device of claim 1, further comprising:
   receiving an indication of the first option; and
   in response to receiving the indication of the first option, stopping the translating of the viewable area along the third axis and starting translating of the viewable area along the first axis.

9. The computing device of claim 8, wherein the indication of the first option is received as a gesture on a touch-enabled display device.

10. The computing device of claim 1, wherein translating the viewable area along the third axis comprises progressively enlarging one or more results as the one or more results are translated toward a central portion of the viewable area.

11. The computing device of claim 1, wherein each result of the first set of results is ordered along the first axis based at least in part on a relevance ranking, wherein each result of the second set of results is ordered along the first axis based at least in part on a relevance ranking, and wherein the first search query and the second search query are ordered along the second axis based at least in part on a relevance ranking.

12. A method implemented on a computing device having at least one processor and at least one display device, the method comprising:
   receiving a first search query;
   displaying the first search query and a first set of results ordered along a first axis within a viewable area of the display device;
   automatically determining a second search query related to the first search query;
   displaying the second search query and a second set of results ordered along the first axis within the viewable area, wherein the second search query is ordered with respect to the first search query along a second axis that is substantially orthogonal to the first axis; and
   providing at least three options for translating the viewable area, comprising:
      a first option for translating the viewable area along the first axis;
      a second option for translating the viewable area along the second axis; and
      a third option for translating the viewable area along a third axis that is substantially orthogonal to the first axis and the second axis;
   receiving a selection of a result;

upon receiving a selection of the third option and the selected result, translating the viewable area linearly along the third axis, wherein translating the viewable area linearly along the third axis comprises displaying a third set of results ranked by relevance to the selected result, and wherein each successive result appears smaller along the third axis with decreasing relevance.

13. The method of claim 12, further comprising:
upon receiving a selection of a second result, stopping the translation of the viewable area along the third axis.

14. The method of claim 12, wherein the third set of search results is not ordered along the second axis.

15. The method of claim 12, wherein each result of the first set of results is ordered along the first axis based at least in part on a relevance ranking, wherein each result of the second set of results is ordered along the first axis based at least in part on a relevance ranking, and wherein the first search query and the second search query are ordered along the second axis based at least in part on a relevance ranking.

16. The method of claim 12, wherein translating the viewable area along the third axis continues until an indication to stop the translating is received.

17. A computing device having a processor and memory with computer-readable instructions stored thereon that when executed by the processor cause the computing device to perform a method, the method comprising:
receiving a first search query;
displaying the first search query and a first set of results ordered along a first axis within a viewable area of the display device;
automatically determining a second search query related to the first search query;
displaying the second search query and a second set of results ordered along the first axis within the viewable area; and
providing at least three options for translating the viewable area, comprising:
a first option for translating the viewable area along the first axis;
a second option for translating the viewable area along a second axis that is substantially orthogonal to the first axis; and
a third option for translating the viewable area along a third axis that is substantially orthogonal to the first axis and the second axis;
receiving a selection of a result;
upon receiving a selection of the third option and the selected result, translating the viewable area linearly along the third axis to display a third set of results that are ranked in order of relevance to the selected result, wherein each successive result of the third set of results is displayed with decreasing size along the third axis based on decreasing relevance to the selected result.

18. The computing device of claim 17, further comprising: storing the selected result.

19. The computing device of claim 17, further comprising: automatically determining a fourth search query based on the selected result; and
displaying the fourth search query and a fourth set of results, wherein the fourth search query was not previously displayed along the second axis.

20. The computing device of claim 19, wherein the third set of search results is not ordered along the second axis.

* * * * *